United States Patent
Ditomasso et al.

(10) Patent No.: US 10,100,843 B2
(45) Date of Patent: Oct. 16, 2018

(54) GAS TURBINE ENGINE FRONT CENTER BODY ARCHITECTURE

(71) Applicant: United Technologies Corporation, Hartford, CT (US)

(72) Inventors: John C. Ditomasso, Glastonbury, CT (US); Gregory E. Reinhardt, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 319 days.

(21) Appl. No.: 14/623,356

(22) Filed: Feb. 16, 2015

(65) Prior Publication Data

US 2016/0363131 A1 Dec. 15, 2016

(51) Int. Cl.
| | |
|---|---|
| F01D 25/28 | (2006.01) |
| F04D 29/54 | (2006.01) |
| F01D 25/24 | (2006.01) |
| F04D 29/64 | (2006.01) |
| F01D 25/16 | (2006.01) |
| F02C 7/20 | (2006.01) |

(52) U.S. Cl.
CPC ......... *F04D 29/542* (2013.01); *F01D 25/243* (2013.01); *F04D 29/644* (2013.01); *F01D 25/162* (2013.01); *F01D 25/28* (2013.01); *F02C 7/20* (2013.01); *F05D 2250/11* (2013.01)

(58) Field of Classification Search
CPC .... F04D 29/542; F04D 29/644; F01D 25/243; F01D 25/162; F01D 25/28; F02C 7/20; F05D 2250/11

USPC .... 415/122.1, 110, 111, 209.3, 209.2, 209.4, 415/210.1, 189, 213.1, 108, 214.1, 215.1, 415/182.1, 915, 173.7, 199.1, 199.2, 415/199.5; 416/189
See application file for complete search history.

(56) References Cited

U.S. PATENT DOCUMENTS

| | | | |
|---|---|---|---|
| 8,360,714 B2 | 1/2013 | Otto et al. | |
| 8,366,385 B2 | 2/2013 | Davis et al. | |
| 9,121,367 B2 * | 9/2015 | Karl | |
| 9,410,447 B2 * | 8/2016 | Coffin | F01D 25/16 |
| 2003/0097844 A1 | 5/2003 | Seda | |
| 2004/0060280 A1 * | 4/2004 | Malmborg | F02C 7/045 60/226.1 |
| 2007/0264128 A1 * | 11/2007 | Grudnoski | F01D 25/162 416/244 R |
| 2008/0008583 A1 * | 1/2008 | Suciu | F01D 9/042 415/208.1 |

(Continued)

FOREIGN PATENT DOCUMENTS

| | | |
|---|---|---|
| WO | 2014046965 | 3/2014 |
| WO | 2015026899 | 2/2015 |

OTHER PUBLICATIONS

Extended European Search Report for European Application No. 16155879.6 dated Jul. 12, 2016.

*Primary Examiner* — Logan Kraft
*Assistant Examiner* — Brian Delrue
(74) *Attorney, Agent, or Firm* — Carlson, Gaskey & Olds, P.C.

(57) ABSTRACT

A center body support for a gas turbine engine includes an outer annular wall. An aft flange extends radially outward from the outer annular wall. A brace interconnects the aft flange to a forward portion of the outer annular wall. The aft flange, brace and forward portion of the outer annual wall provide a unitary, one-piece structure.

14 Claims, 3 Drawing Sheets

(56) References Cited

U.S. PATENT DOCUMENTS

| | | | |
|---|---|---|---|
| 2008/0019830 A1* | 1/2008 | Suciu | B64D 27/26 |
| | | | 415/213.1 |
| 2008/0022653 A1 | 1/2008 | Schilling | |
| 2008/0044281 A1* | 2/2008 | Suciu | F02C 3/073 |
| | | | 415/182.1 |
| 2008/0087023 A1* | 4/2008 | Suciu | F01D 5/022 |
| | | | 60/797 |
| 2008/0095618 A1* | 4/2008 | Suciu | F01D 5/022 |
| | | | 415/182.1 |
| 2012/0257960 A1* | 10/2012 | Reinhardt | F01D 25/162 |
| | | | 415/122.1 |
| 2013/0084174 A1 | 4/2013 | Maalouf et al. | |
| 2014/0003922 A1* | 1/2014 | Daniels | F01D 25/24 |
| | | | 415/182.1 |
| 2014/0227078 A1* | 8/2014 | Chokshi | F01D 9/065 |
| | | | 415/68 |
| 2016/0230598 A1* | 8/2016 | Cherolis | F01D 9/065 |

* cited by examiner

GAS TURBINE ENGINE FRONT CENTER BODY ARCHITECTURE

BACKGROUND

This disclosure relates to a gas turbine engine, and in particular, to a case structure therefor.

Gas turbine engines typically include one or more rotor shafts that transfer power and rotary motion from a turbine section to a compressor section and fan section. The rotor shafts are supported within an engine static structure, which is typically constructed of modules with individual case sections which are joined together at bolted flanges. The flanges form a joint capable of withstanding the variety of loads transmitted through the engine static structure. An ongoing issue for gas turbine engines is the ease and speed at which certain components in such engines can be serviced.

In one example engine configuration, a center body support transmits load from the engine static structure of the core engine through fan exit guide vanes to a pylon. The center body support receives loads from a bearing and a geared architecture in one example configuration.

SUMMARY

In one exemplary embodiment, a center body support for a gas turbine engine includes an outer annular wall. An aft flange extends radially outward from the outer annular wall. A brace interconnects the aft flange to a forward portion of the outer annular wall. The aft flange, brace and forward portion of the outer annual wall provide a unitary, one-piece structure.

In a further embodiment of the above, an inner annular wall is radially spaced from and structurally interconnected to the outer annular wall by a circumferential array of struts.

In a further embodiment of any of the above, the inner and outer annular walls, the struts and the brace are provided by a one-piece casting.

In a further embodiment of any of the above, the inner annular wall includes a static mounting feature configured to support a bearing.

In a further embodiment of any of the above, the aft flange is annular. The brace, the aft flange and the outer annular wall provide a triangular cross-sectional shape.

In a further embodiment of any of the above, the aft flange extends in a radial plane perpendicular to a central axis of the center body support.

In a further embodiment of any of the above, the aft flange includes apertures configured to receive at least one of a wire, fluid line or conduit.

In a further embodiment of any of the above, the aft flange includes inner and outer mounting features spaced radially apart from one another. The inner and outer mounting feature is configured to respectively receive first and second sets of fasteners.

In a further embodiment of any of the above, the forward portion extends in a radially outward direction from the outer annular wall. The forward portion includes a forward mounting feature configured to receive a third set of fasteners.

In a further embodiment of any of the above, the outer and forward mounting features are configured to receive a fan exit guide vane mounting ring.

In a further embodiment of any of the above, a circumferential array of braces interconnects the aft flange to a forward portion. The braces have spaces provided between one another.

In another exemplary embodiment, a gas turbine engine includes a core flow path and a bypass flow path. An engine static structure includes fan exit guide vanes arranged in the bypass flow path and secured to a core engine. The core engine includes a compressor that has a compressor rotor mounted to a shaft that is configured to rotate about an engine axis relative to the engine static structure. The compressor includes a compressor case arranged about the compressor rotor. A center body support is arranged in the core flow path. The center body support includes radially spaced apart inner and outer annular walls interconnected by a circumferential array of struts. The outer annular wall is secured to the compressor case. An aft flange extends radially outward from the outer annular wall. The aft flange is secured to the fan exit guide vanes. A brace interconnects the aft flange to a forward portion of the outer annular wall. The forward portion is secured to the fan exit guide vanes. The outer annular wall, aft flange, brace and forward portion provide a unitary, one-piece structure.

In a further embodiment of any of the above, the aft flange extends in a radial plane perpendicular to a central axis of the center body support. The brace, the aft flange and the outer annular wall provide a triangular cross-sectional shape.

In a further embodiment of any of the above, the aft flange includes apertures configured to receive at least one of a wire, fluid line or conduit.

In a further embodiment of any of the above, the aft flange includes inner and outer mounting features spaced radially apart from one another. The forward portion includes a forward mounting feature. First and third sets of fasteners secure the fan exit guide vanes respectively to the outer mounting feature and the forward mounting feature. A second set of fasteners secure the inner mounting feature to the compressor case.

In a further embodiment of any of the above, an inlet guide vane assembly is arranged at an inlet of the core engine. The inlet guide vane assembly is secured to the outer annular flange.

In a further embodiment of any of the above, the inlet guide vane assembly includes an inlet fairing. The inlet fairing is secured to the outer annular flange immediately upstream of the fan exit guide vanes.

In a further embodiment of any of the above, the inner and outer annular walls, the struts and the brace are provided by a one-piece casting.

In a further embodiment of any of the above, a circumferential array of braces interconnects the aft flange to a forward portion. The braces have spaces provided between one another.

In a further embodiment of any of the above, there is a bearing. The inner annular wall includes a static mounting feature supporting the bearing.

In a further embodiment of any of the above, there is a geared architecture. The static mounting feature supports the geared architecture.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
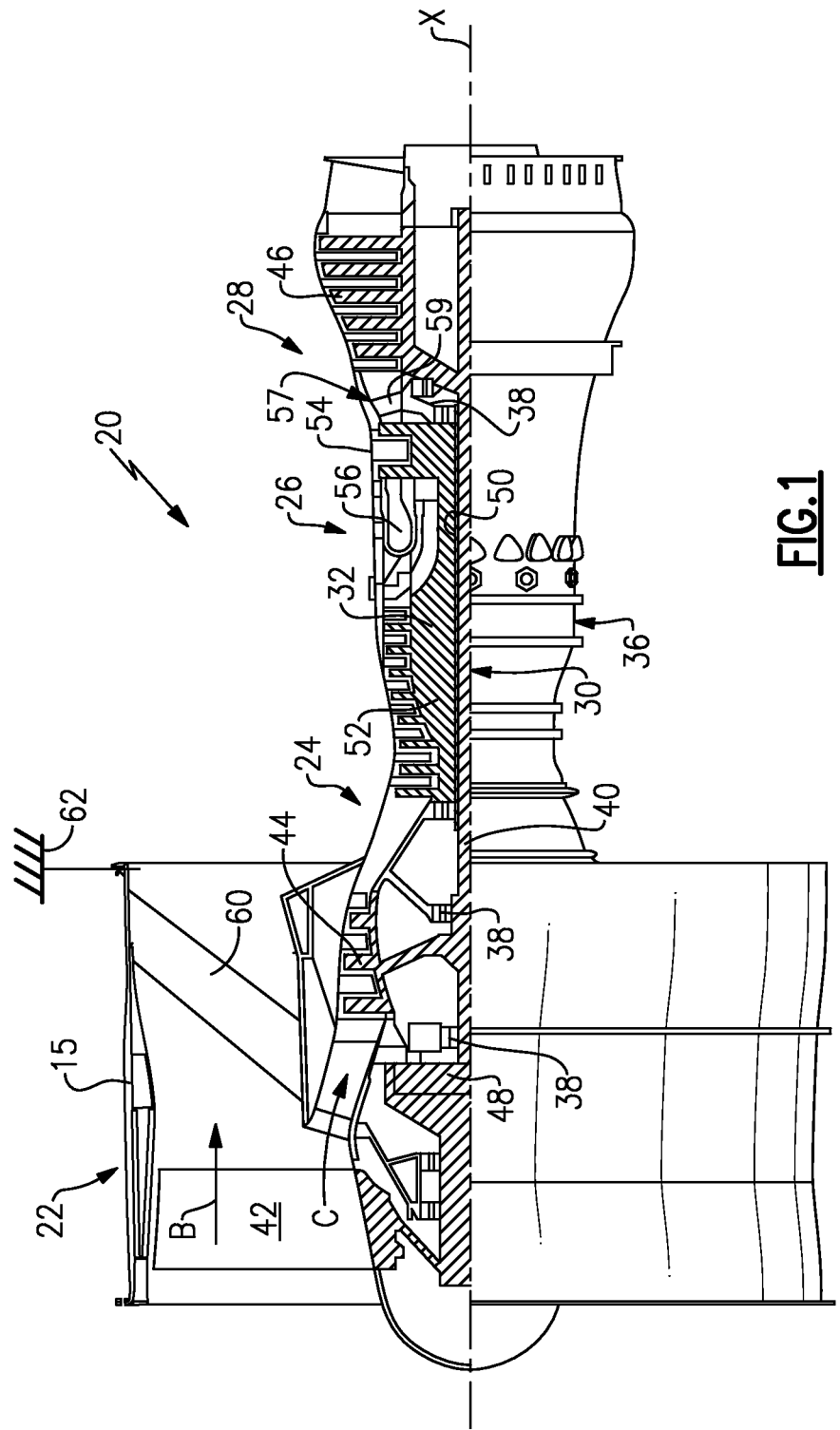
FIG. 1 is a schematic cross-section of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct at least partially defined within a fan case 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption —also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Circumferentially arranged fan exit guide vanes 60 support the engine core with respect to the fan case 15. Load is transferred from the fan exit guide vanes 60 to a pylon 62 of the aircraft airframe.

Figure 2:
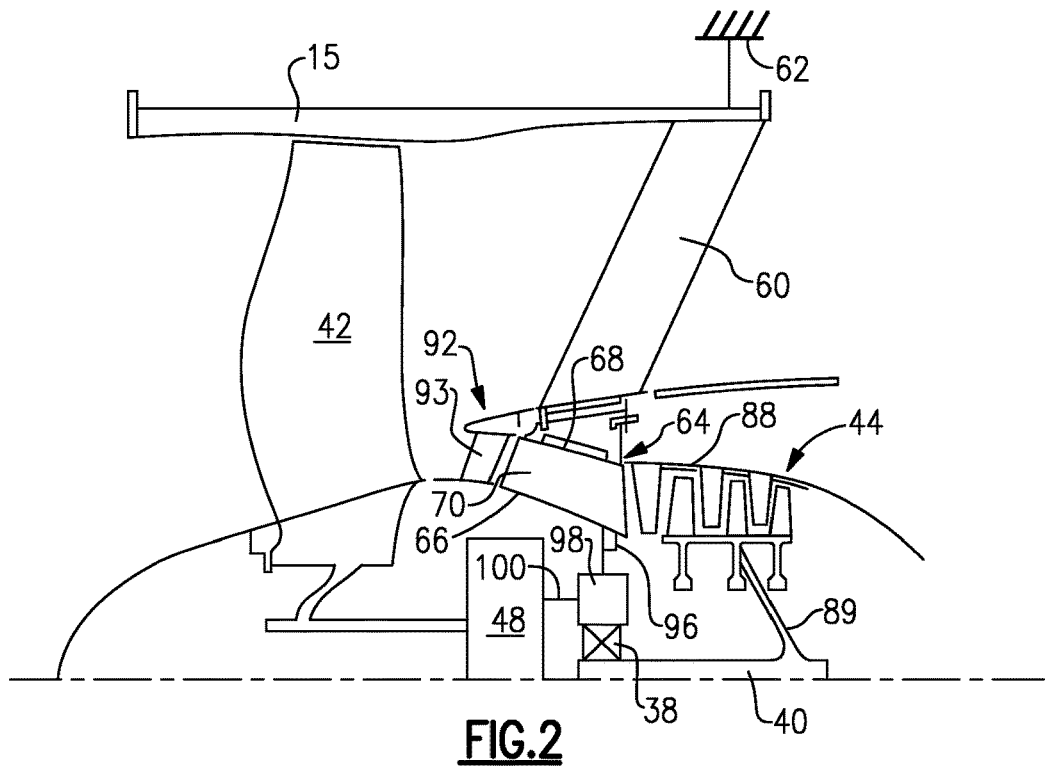
FIG. 2 is an enlarged cross-sectional view of a forward portion of the engine through a center body support.
Figure 3:
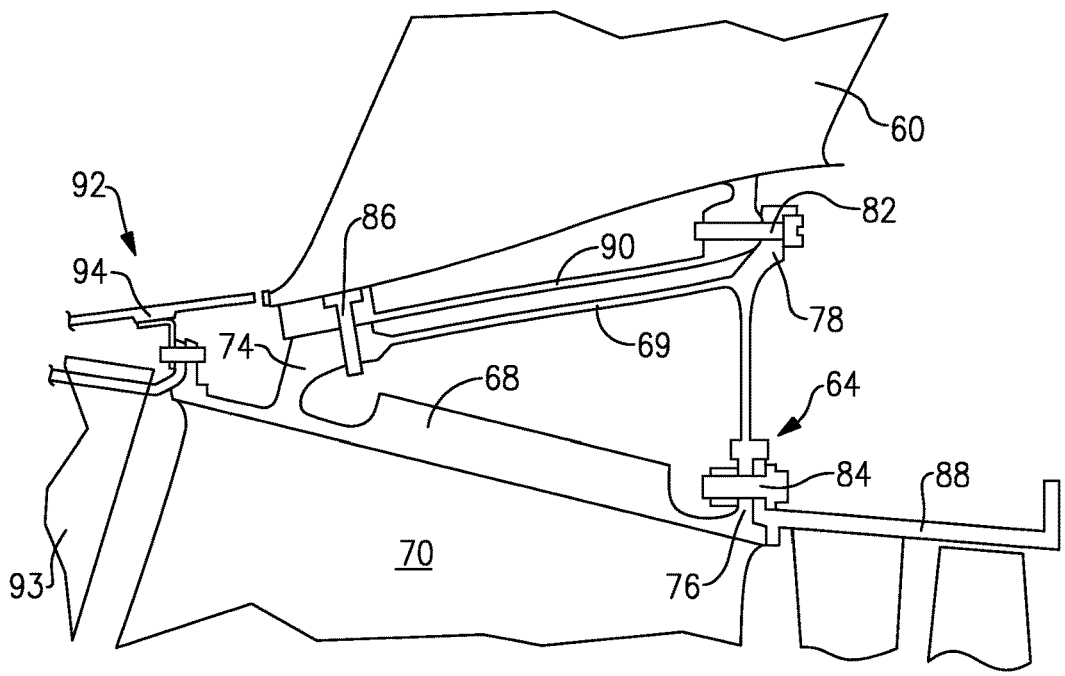
FIG. 3 is a further enlarged cross-sectional view through the center body support shown in FIG. 2.

Referring to FIG. 2, a center body support 64 is secured to the fan exit guide vane 60 at its inner diameter. As shown in FIGS. 2 and 3, the center body support 64 includes radially spaced apart inner and outer annular walls 66, 68 interconnected to one another by a circumferential array of struts 70, best shown in FIG. 4.

Figure 4:
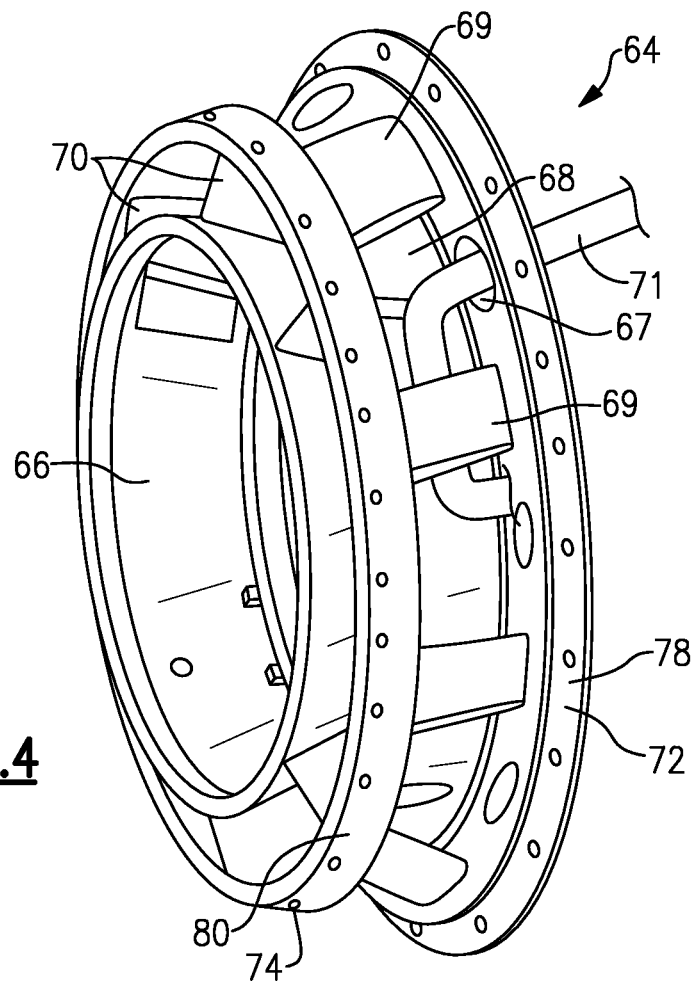
FIG. 4 is a perspective view of the center body support shown in FIG. 3.
Figure 5:
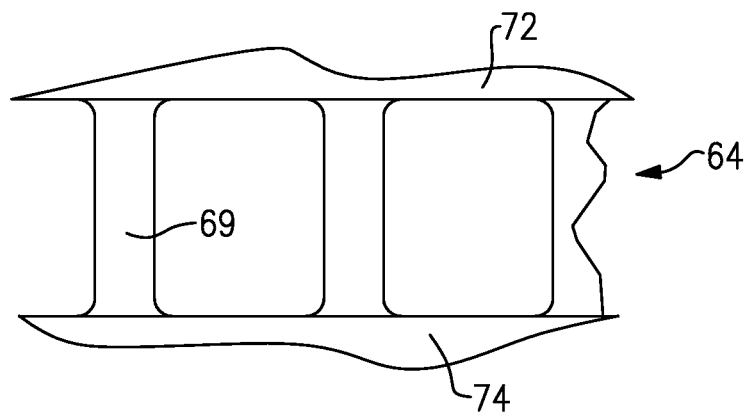
FIG. 5 is an elevational view of circumferentially arranged braces that interconnect an aft flange to a forward portion of the center body support.

Referring to FIGS. 3 and 4, an aft flange 72 extends radially outward from the outer annular wall 68 in a radial plane that is perpendicular to the engine axis X, which corresponds to the central axis of the center body support 64. The aft flange 72 is annular and includes apertures 67 that receive an element 71, such as wires, fluid lines and/or conduits.

A circumferential array of braces 69 interconnect the aft flange 72 to a forward portion 74 of the outer annular wall 68 to provide a triangular cross-sectional shape, best shown in FIG. 3. The outer annular wall 68, aft flange 72, brace 69 and forward portion 74 provide a unitary, one-piece structure. In the example embodiment, the inner and outer annular walls 66, 68 and struts 70 as well as the aft flange 72, brace 69 and forward portion 74 are provided by a one-piece casting to provide the unitary structure.

The aft flange 72 includes inner and outer mounting features 76, 78 radially spaced apart from one another. The forward portion 74 includes a forward mounting feature 80. First and third sets of fasteners 82, 86 respectively secure the outer and forward mounting features 78, 80 to a mounting ring 90 that supports the inner diameter of the fan exit guide vane 60. The mounting ring 90 may be provided by a one-piece annular structure or multiple arcuate segments.

A second set of fasteners 84 secures the inner mounting feature 76 to a compressor case 88 that surrounds at least one stage of compressor blades supported on a rotor 89 mounted to the inner shaft 40, as best shown in FIGS. 2 and 3.

An inlet guide vane assembly 92 is arranged at an inlet of the core engine. The inlet guide vane assembly 92 includes a circumferential array of inlet vanes 93 and an inlet fairing 94 that provides an inner flow path of the bypass flow path. The inlet guide vane assembly 92 is secured to the outer annular wall 68.

Returning to FIG. 2, the inner annular wall 66 includes a static mounting feature 96 that supports a structural assembly 98. The structural assembly 98 supports a bearing 38 carrying the inner shaft 40. The structural assembly 98 may also support a torque frame 100 of the geared architecture 48 for fixedly supporting a ring gear or star gears against rotation.

The triangular configuration of the outer annular wall 68, aft flange 72, forward portion 74 and braces 69 transfers the axial load from the aft flange 72 to the forward portion 74, which prevents the aft flange 72 from rolling forward or aftward during heavy loading during engine operation and overloading the first and third sets of fasteners 82, 86.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A center body support for a gas turbine engine comprising:
a fan exit guide vane mounting ring;
an outer annular wall;
an aft flange extending radially outward from the outer annular wall;
an inner annular wall radially spaced from and structurally interconnected to the outer annular wall by a circumferential array of struts; and
a plurality of braces interconnecting the aft flange to a forward portion of the outer annular wall;
wherein the aft flange, brace and forward portion of the outer annual wall provide a unitary, one-piece structure; and
wherein the aft flange includes inner and outer mounting features spaced radially apart from one another, the inner and outer mounting feature respectively receive first and second sets of fasteners, the forward portion extends in a radially outward direction from the outer annular wall, the forward portion includes a forward mounting feature that receives a third set of fasteners, the outer and forward mounting features are secured to the fan exit guide vane mounting ring respectively by the first and third sets of fasteners, and the plurality of braces comprises a circumferential array of braces that interconnects the aft flange to the forward portion, the braces having spaces provided between one another, wherein forward, outer and inner mounting features define a triangular cross-sectional shape, the forward portion having a radial inner end opposite a radial outer end, the brace joined at the radial outer end, and the brace transfers an axial load from the aft flange to the radial outer end of the forward portion.

2. The center body support according to claim 1, wherein the inner and outer annular walls, the struts and the brace are provided by a one-piece casting.

3. The center body support according to claim 1, wherein the inner annular wall supports a bearing.

4. The center body support according to claim 1, wherein the aft flange is annular.

5. The center body support according to claim 4, wherein the aft flange extends in a radial plane perpendicular to a central axis of the center body support.

6. The center body support according to claim 4, wherein the aft flange includes apertures that receive at least one of a wire, fluid line or conduit.

7. A gas turbine engine comprising:
a core flow path and a bypass flow path;
an engine static structure includes fan exit guide vanes arranged in the bypass flow path and secured to a core engine, the core engine includes a compressor having a compressor rotor mounted to a shaft that rotates about an engine axis relative to the engine static structure, the compressor includes a compressor case arranged about the compressor rotor;
a center body support arranged in the core flow path, the center body support includes:
radially spaced apart inner and outer annular walls interconnected by a circumferential array of struts, the outer annular wall secured to the compressor case;

an aft flange extending radially outward from the outer annular wall, the aft flange secured to the fan exit guide vanes; and a plurality of braces interconnecting the aft flange to a forward portion of the outer annular wall, the forward portion secured to the fan exit guide vanes, the outer annular wall, aft flange, brace and forward portion provide a unitary, one-piece structure; and wherein the aft flange includes inner and outer mounting features spaced radially apart from one another, the inner and outer mounting feature respectively receive first and second sets of fasteners, the forward portion extends in a radially outward direction from the outer annular wall, the forward portion includes a forward mounting feature that receives a third set of fasteners, wherein the first and third sets of fasteners secure the fan exit guide vanes respectively to the outer mounting feature and the forward mounting feature, and the second set of fasteners secures the inner mounting feature to the compressor case, and the plurality of braces comprises a circumferential array of braces that interconnects the aft flange to the forward portion, the braces having spaces provided between one another, wherein forward, outer and inner mounting features define a triangular cross-sectional shape, the forward portion having a radial inner end opposite a radial outer end, the brace joined at the radial outer end, and the brace transfers an axial load from the aft flange to the radial outer end of the forward portion.

8. The gas turbine engine according to claim 7, wherein the aft flange extends in a radial plane perpendicular to a central axis of the center body support.

9. The gas turbine engine according to claim 7, wherein the aft flange includes apertures that receive at least one of a wire, fluid line or conduit.

10. The gas turbine engine according to claim 7, comprising an inlet guide vane assembly arranged at an inlet of the core engine, the inlet guide vane assembly secured to the outer annular flange.

11. The gas turbine engine according to claim 10, wherein the inlet guide vane assembly includes an inlet fairing, the inlet fairing secured to the outer annular flange immediately upstream of the fan exit guide vanes.

12. The gas turbine engine according to claim 7, wherein the inner and outer annular walls, the struts and the brace are provided by a one-piece casting.

13. The gas turbine engine according to claim 7, comprising a bearing, wherein the inner annular wall supports the bearing.

14. The gas turbine engine according to claim 13, comprising a geared architecture, wherein the inner annular wall static mounting feature supports the geared architecture.

* * * * *